US012016089B1

(12) United States Patent
Miele

(10) Patent No.: US 12,016,089 B1
(45) Date of Patent: Jun. 18, 2024

(54) SYSTEM, APPARATUS, AND METHOD FOR A THERMAL TARGET

(71) Applicant: Anthony Miele, Quinton, VA (US)

(72) Inventor: Anthony Miele, Quinton, VA (US)

( * ) Notice: Subject to any disclaimer, the term of this patent is extended or adjusted under 35 U.S.C. 154(b) by 0 days.

(21) Appl. No.: 18/442,757

(22) Filed: Feb. 15, 2024

(51) Int. Cl.

| | |
|---|---|
| ***H05B 3/22*** | (2006.01) |
| ***H05B 1/02*** | (2006.01) |
| ***H05B 3/00*** | (2006.01) |
| ***H05B 3/12*** | (2006.01) |
| *F41J 1/00* | (2006.01) |

(52) U.S. Cl.
CPC ............. *H05B 3/22* (2013.01); *H05B 1/0227* (2013.01); *H05B 3/0004* (2013.01); *H05B 3/12* (2013.01); *F41J 1/00* (2013.01)

(58) Field of Classification Search
CPC ...... H05B 3/22; H05B 1/0227; H05B 3/0004; H05B 3/12; F41J 1/00
USPC ........................ 250/493.1, 494.1, 495.1, 504
See application file for complete search history.

(56) References Cited

U.S. PATENT DOCUMENTS 4,240,212 A * 12/1980 Marshall ................... F41G 3/26 273/348
4,260,160 A * 4/1981 Ejnell ........................ F41J 2/02 250/503.1
4,422,646 A * 12/1983 Rosa .......................... F41J 2/02 273/408
4,946,171 A * 8/1990 Merle ........................ F41J 1/00 273/371
6,806,480 B2 * 10/2004 Reshef ................... G09B 9/003 250/495.1
7,377,517 B2 * 5/2008 Andren ...................... F41J 2/02 273/348.1
7,820,969 B2 * 10/2010 Guinn ........................ F41J 2/02 250/504 R
8,424,876 B2 * 4/2013 Hutchinson ................ F41J 2/02 273/348.1
2002/0096512 A1 * 7/2002 Abbott ...................... C23C 4/02 492/46
2003/0121906 A1 * 7/2003 Abbott ..................... H05B 3/12 219/543
2008/0169609 A1 * 7/2008 Hetland ..................... F41J 2/02 264/105
2011/0042900 A1 * 2/2011 Hutchinson ................ F41J 2/02 273/381
2011/0175292 A1 * 7/2011 Carni ......................... F41J 2/02 273/348.1

* cited by examiner

*Primary Examiner* — Michael Maskell
(74) *Attorney, Agent, or Firm* — Keefe IP Law, PLLC

(57) ABSTRACT

An apparatus for a target for a weapon is disclosed. The apparatus has a conductivity layer configured to be removably attached to the target, at least one thermal device configured to be removably attached to the conductivity layer, and a power storage electrically connected to the at least one thermal device. The at least one thermal device is configured to heat or cool the conductivity layer. The conductivity layer has a thermal conductivity that is both greater than the target and between 200 W/mK and 400 W/mK.

20 Claims, 5 Drawing Sheets

SYSTEM, APPARATUS, AND METHOD FOR A THERMAL TARGET

TECHNICAL FIELD

The present disclosure generally relates to a system, apparatus, and method for a target, and more particularly to a system, apparatus, and method for a thermal target.

BACKGROUND

Conventional systems for shooting at night previously typically involved night vision devices or sights. However, because the effectiveness of night vision devices usually depends on ambient illumination on a given night, the effectiveness of shooting using night vision devices varies based on ambient conditions. Accordingly, many systems for shooting at night now utilize thermal imaging to overcome deficiencies in night vision systems.

Thermal imaging devices for use in shooting often involve a thermal sight or scope for a weapon being operated. The thermal sight may detect a temperature difference of a target, such as an animal or person, from the target's surroundings. This allows for identification of a target at which a weapon can be fired.

Although actual targets such as an animal or person produce heat that may be identified by a thermal sight, other targets such as shooting range targets made from metal or other materials may not be identified by thermal sights. This makes target practice utilizing thermal imaging devices (e.g., at night) challenging, as the target typically lacks a temperature difference relative to its surroundings.

For example, conventional systems for target practice are often suitable for night vision devices but not thermal imaging devices. Also, conventional systems lack efficient and manageable configurations for providing target practice involving identifying temperature differences of targets from surroundings using thermal imaging devices.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus for a target for a weapon. The apparatus includes a conductivity layer configured to be removably attached to the target, at least one thermal device configured to be removably attached to the conductivity layer, and a power storage electrically connected to the at least one thermal device. The at least one thermal device is configured to heat or cool the conductivity layer. The conductivity layer has a thermal conductivity that is both greater than the target and between 200 W/mK and 400 W/mK.

In another aspect, the present disclosure is directed to a method for a target for a weapon. The method includes removably attaching a conductivity layer to the target, removably attaching at least one thermal device to the conductivity layer, electrically connecting a controller to the at least one thermal device, electrically connecting a power storage to the controller, removably attaching a thermal sensor to the target and electrically connecting the thermal sensor to the controller, sensing an actual temperature of the target using the thermal sensor and transferring a signal or a data indicative of the actual temperature to the controller, and heating or cooling the conductivity layer based on the controller controlling the power storage to transfer electricity to the at least one thermal device based on the signal or the data.

DETAILED DESCRIPTION AND INDUSTRIAL APPLICABILITY

Figure 1:
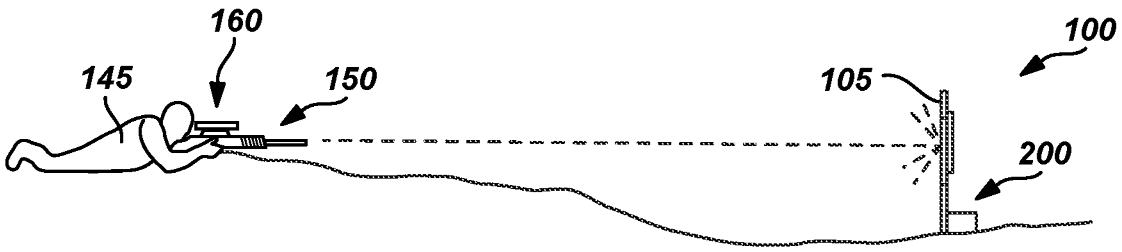
FIG. 1 is a side view of an exemplary embodiment of the present invention.

The exemplary disclosed system, apparatus, and method may provide a thermal target that may be used in conjunction with using a weapon with a thermal imaging device. FIG. 1 illustrates an exemplary disclosed system 100 that may include an apparatus 200 that may be disposed at a target (e.g., a target assembly 105). A user 145 may use a weapon 150 with a thermal imaging device 160 to fire at target assembly 105.

Figure 2:
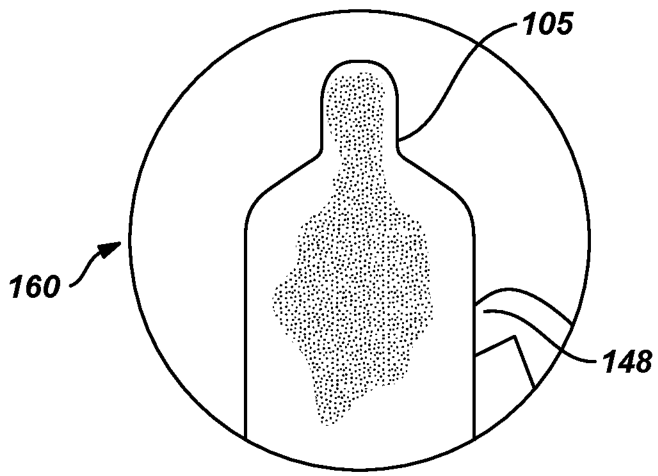
FIG. 2 is a schematic view of an exemplary embodiment of the present invention.
Figure 3:
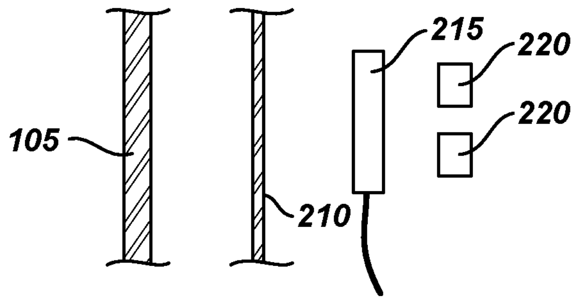
FIG. 3 is an exploded, sectional view of an exemplary embodiment of the present invention.

Target assembly 105 may be any suitable target for use with weapon 150. Target assembly 105 may have a human silhouette shape as illustrated in FIG. 2. Target assembly 105 may have an elliptical (e.g., circular) shape and may include a bullseye and/or rings or other markings for measuring or scoring the proximity of a shot to the bullseye. Target assembly 105 may be any other desired shape such as, for example, an animal shape, a polygonal shape, and/or any other suitable shape.

Weapon 150 may be operated by user 145 such as, for example, a user (e.g., a shooter) utilizing system 100 for target practice. Weapon 150 may be a firearm such as, for example, a rifle, a handgun, a machine gun, or any other suitable weapon for launching a projectile such as a bullet. Weapon 150 may also be a larger weapon such as a vehicle-mounted weapon (e.g., mounted to a ground, air, or sea vehicle), a cannon, a missile launcher, and/or any other weapon that may be fired at a target.

Target assembly 105 may be formed from any suitable material and have any suitable thickness for use with weapon 150. Portions of target assembly 105 may be formed from metal, structural plastic, wood, composite material, and/or any other suitable structural material. Target assembly 105 may be formed from steel material. In at least some exemplary embodiments, target assembly 105 may be formed from AR500 steel or similar material. Target assembly 105 may include a plate at which weapon 150 may be fired. Target assembly 105 may be any suitable thickness (e.g., a plate of any suitable thickness) such as, for example, between about ⅛" and about 1" or more, between about ¼" and about ½", or between about ⅜" and about ⅝" (e.g., about ½"). A material and/or thickness of target assembly 105 may be based on a magnum, caliber, cartridge, and/or any other suitable criteria of weapon 150 and/or ammunition that can be used with weapon 150. Target assembly 105 may be formed from any suitable material and/or formed with any suitable thickness so that a projectile (e.g., a bullet) fired from weapon 150 breaks up upon impacting target assembly 105 (e.g., as opposed to puncturing, denting, fracturing, and/or passing through target assembly 105). In at least some exemplary embodiments, target assembly 105 may include a plate of AR 500 steel having a thickness of about ½".

Thermal imaging device 160 may be any suitable device for helping user 145 to aim weapon 150 at target assembly 105. Thermal imaging device 160 may be an infrared device. Thermal imaging device 160 may be a sight or scope that may be attached to weapon 150, to headgear (e.g., helmet) or face or other body part of user 145, and/or attached using any other suitable attachment for use by user 145 in aiming weapon 150. Thermal imaging device 160 may also be attached to or near weapon 150 when weapon 150 is fired without user 145 (e.g., during automated, remote, and/or robotic operation of weapon 150). For example, thermal imaging device 160 may be integrated with a camera (e.g., a video camera).

Thermal imaging device 160 may be any suitable type of thermal imaging device for displaying thermal differences between objects depicted in a scope or sight (e.g., to user 145). For example as illustrated in FIG. 2, a sight or scope of thermal imaging device 160 may depict objects based on temperature differences between objects and/or portions of objects. For example, relatively hotter objects and/or portions of objects may be depicted as relatively brighter (e.g., or darker, and/or as having certain colors) in a sight or scope of thermal imaging device 160. For example, if portions of target assembly 105 (e.g., and/or an animal or person) are warmer than objects (e.g., object 148) surrounding target assembly 105, then thermal imaging device 160 may identify these thermal differences (e.g., and depict them as illustrated in FIG. 2 and described above). Thermal imaging device 160 may be a thermographic weapon sight. Thermal imaging device 160 may include a thermographic camera that may be an infrared imaging device. Thermal imaging device 160 may include an uncooled infrared image detector or a cooled infrared image detector. Thermal imaging device 160 may be a sight or scope that allows for digital and/or optical zooming. Thermal imaging device 160 may detect temperature differences as low as ½° F. or less.

As illustrated in FIG. 1, apparatus 200 may be disposed near and/or attached to target assembly 105. As illustrated in FIGS. 3-8, apparatus 200 may include a thermal assembly 205 and a shield assembly 300. Shield assembly 300 may shield portions of thermal assembly 205 from projectiles fired from weapon 150.

Thermal assembly 205 may include a conductivity layer 210, one or more heaters 215 (e.g., and/or coolers 215), one or more attachment devices 220, a power storage 225, and a controller 230. Attachment devices 220 may attach heater 215 (e.g., and/or cooler 215) and/or conductivity layer 210 to target assembly 105. Power storage 225 may provide power to one or more heaters 215 (e.g., and/or coolers 215). Controller 230 may control an operation of power storage 225.

Conductivity layer 210 may be any suitable layer for conducting and spreading heat from one or more heaters 215 (e.g., or spreading cold from coolers 215). Conductivity layer 210 may be formed from a material having a greater thermal conductivity than the material of target assembly 105. For example, a thermal conductivity of target assembly 105 may be less than a thermal conductivity of conductivity layer 210. For example, conductivity layer 210 may have a thermal conductivity of between about 50 W/mK (Watts per meter-Kelvin) and about 500 W/mK (e.g., or more), between about 100 W/mK and about 450 W/mK, between about 200 W/mK and about 450 W/mK, between about 200 W/mK and about 400 W/mK, or between about 350 W/mK and about 450 W/mK, Conductivity layer 210 may have a thermal conductivity of between about 4 and about 9 times greater than steel, between about 5 and about 9 times greater than steel, or between about 8 and about 9 times greater than steel. Conductivity layer 210 may be formed from copper, aluminum, carbon fiber material, ceramic material, and/or brass. Conductivity layer 210 may be a thin plate or foil. Conductivity layer 210 may have a thickness of between about 3 mils and about 10 (e.g., or more) mils. In at least some exemplary embodiments, conductivity layer 210 may be a copper plate having a thickness of between about 5 mils and about 10 mils (e.g., about 8 mils). Conductivity layer 210 may also include a bladder (e.g., formed from a plastic, rubber, and/or elastomeric material) that may contain a fluid such as, for example, water, air, and/or any other suitable material. Also for example, conductivity layer 210 may be integrated into the exemplary disclosed thermal device for example as described further below.

Figure 7:
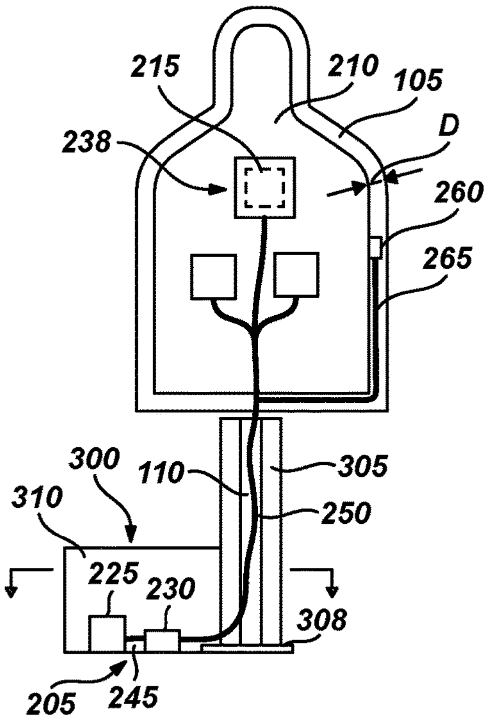
FIG. 7 is a rear view of an exemplary embodiment of the present invention.

Conductivity layer 210 may have any suitable shape or configuration. For example as illustrated in FIG. 7, conductivity layer 210 may have a similar and slightly smaller shape as target assembly 105 so as to form a contour similar to and slightly smaller than a perimeter of target assembly 105. For example as illustrated in FIG. 7, a distance "D" between an edge of target assembly 105 and an edge of conductivity layer 210 may be between about ⅛" and about 1", between about ¼" and about ⅞", or between about ½" and about ¾". Conductivity layer 210 may be disposed at a surface (e.g., a rear or back surface) of target assembly 105 that is opposite to weapon 150 during an operation of system 100. For example, conductivity layer 210 may be disposed at a backside of target assembly 105 relative to user 145 so that projectiles fired from weapon 150 do not strike conductivity layer 210.

Heater 215 may be any suitable heating device for heating target assembly 105. Heater 215 may be an electric heater. Heater 215 may be a flexible heater. Heater 215 may include a heating plate. Heater 215 may include one or more ceramic heating elements, metal heating elements, thick film heating elements, semiconductor heating elements, polymeric heating elements, and/or any other suitable heating elements.

In at least some exemplary embodiments, device 215 may be a cooling device (e.g., cooler 215) having a cooling element (e.g., an electric cooling device or cooling pad that may be generally similar in type to the exemplary disclosed devices). For example, device 215 may be a cooler 215. Such a cooling device may operate to reduce a temperature of target assembly 105. In at least some exemplary embodiments, device 215 may be a heating and cooling device that may include components similar to as described herein and may selectively heat or cool target assembly 105.

Attachment device 220 may be any suitable device for attaching heater 215 (e.g., and/or cooler 215) and/or conductivity layer 210 to target assembly 105. Attachment device 220 may be a magnetic attachment device (e.g., a magnet). Attachment device 220 may be formed from any suitable magnetic material such as, for example, ceramic magnetic materials (e.g., samarium cobalt magnetic materials), ferrite magnetic materials, alnico magnetic materials, and/or neodymium magnetic materials. Attachment device 220 may be any suitable type of magnetic for magnetically attaching to the exemplary disclosed material of target assembly 105. Attachment device 220 may also be a mechanical fastener. For example, attachment device 220 may be a clip that may be fastened to an edge of target assembly 105 to fasten heater 215 (e.g., and/or cooler 215) and/or conductivity layer 210 to target assembly 105.

Figure 4:
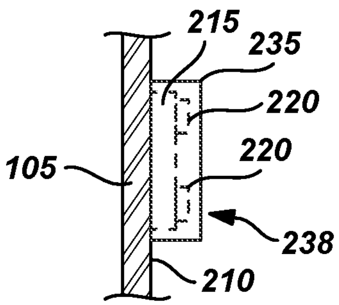
FIG. 4 is a sectional view of an exemplary embodiment of the present invention.
Figure 9:
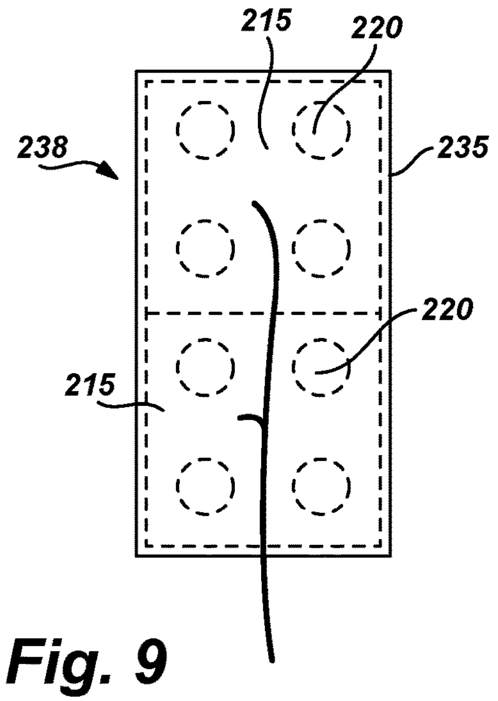
FIG. 9 is a plan view of an exemplary embodiment of the present invention.
Figure 10:
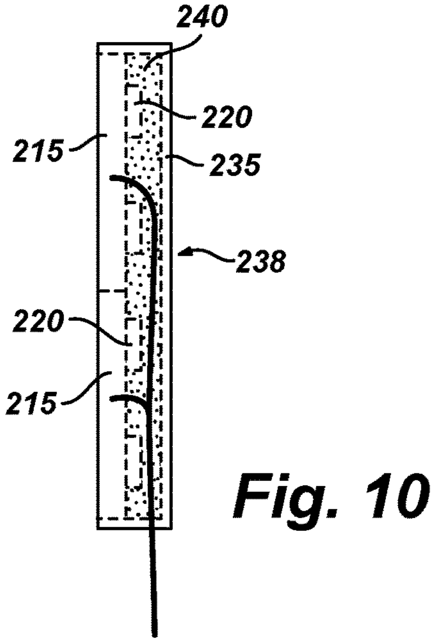
FIG. 10 is a sectional view of an exemplary embodiment of the present invention.

As illustrated in FIGS. 4, 9, and 10, one or more heaters 215 (e.g., and/or coolers 215) and/or one or more attachment devices 220 may be disposed in a housing 235. Housing 235 may be formed from any suitable housing material such as, for example, metal, structural plastic, wood, composite material, tape, and/or any other suitable material. As illustrated in FIG. 10, filler material 240 may be disposed in spaces formed between walls of housing 235 and one or more heaters 215 (e.g., and/or coolers 215) and/or attachment devices 220. Filler material 240 may be any suitable type of filler material (e.g., thermal and/or electrical insulative material) such as, for example, plastic, glass, silicone, polyurethane, PVC, Teflon, fiberglass, nylon, and/or any other suitable material. One or more heaters 215 (e.g., and/or coolers 215), one or more attachment devices 220, housing 235, and/or filler material 240 may together form a thermal device 238.

Returning to FIG. 5, power storage 225 may be any suitable device for storing energy (e.g., electrical energy) and providing stored energy to power one or more heaters 215 (e.g., and/or coolers 215). Power storage 225 may include a battery such as, for example, a nickel-metal hydride battery, a lithium-iron battery, an ultracapacitor battery, a lead-acid battery, a nickel cadmium battery, or any other suitable type of battery. In at least some exemplary embodiments, power storage 225 may include a lithium-iron phosphate battery (e.g., 12V, 24V, 48V or any other suitable battery).

Power storage 225 may include a charging device 228. Charging device 228 may be any suitable battery charger. Charging device 228 may be an electrical plug for electrically connecting power storage 225 to a power source such as a wall outlet (e.g., via an extension cord if applicable). Charging device 228 may also include a portable power supply and/or generator. Charging device 228 may be any suitable device for transferring power to charge power storage 225. Charging device 228 may be removably attachable to power storage 225. For example, charging device 228 may include an electrical connector 229 similar to the exemplary disclosed electrical connectors described below that may be removably attached to power storage 225.

Controller 230 may control an operation of system 100 (e.g., power storage 225) for example as described herein. Controller 230 may be any suitable computing device for controlling an operation of components of system 100. Controller 230 may include for example a processor (e.g., micro-processing logic control device) and/or board components. Controller 230 may include data storage. For example, controller 230 may have storage for storing programming instructions. Controller 230 may communicate with other components of system 100 (e.g., power storage 225 and/or a user device 170 such as a smart phone, smart tablet, computer, and/or any other suitable user device) via wire (e.g., direct wire communication), wireless, a LAN (e.g., via Ethernet LAN), a WAN, a WiFi network, Bluetooth, ZigBee, NFC, IrDA, and/or any other suitable communication technique. Controller 230 may include a user interface (e.g., touchscreen, button, dials, switches, voice control component, and/or any other suitable features). A user (e.g., user 145 or other user) may control controller 230 (e.g., provide input and/or commands) via the exemplary user interface, the exemplary disclosed user device (e.g., user device 170), and/or any other suitable control technique.

Figure 5:
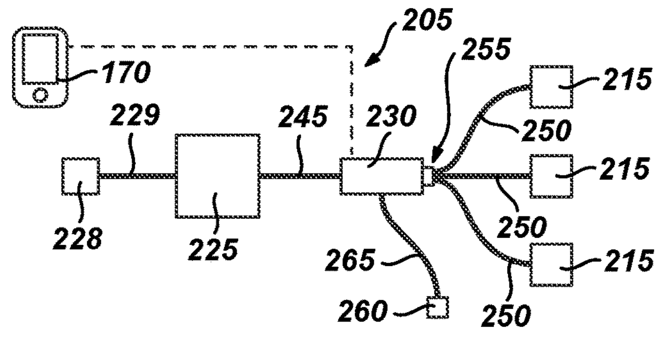
FIG. 5 is a schematic view of an exemplary embodiment of the present invention.

For example as illustrated in FIG. 5, an electrical connector 245 may electrically connect power storage 225 to controller 230. An electrical connector 250 may electrically connect power storage 225 to each heater 215 (e.g., and/or cooler 215). Electrical connectors 229, 245, and 250 may be any suitable connector for transferring electrical energy and/or signals such as, for example, electrical wires, lines, or cords. An electrical splitter 255 may be disposed at the connection of electrical connectors 250 to power storage 225. As illustrated in FIG. 5, electrical splitter 255 may allow for heaters 215 (e.g., and/or coolers 215) to be wired in parallel via electrical connectors 250.

A sensor 260 may be electrically connected to controller 230 via an electrical connector 265 that may be similar to electrical connectors 229, 245, 250, and 255. Sensor 260 may be disposed on target assembly 105 during an operation of system 100. Sensor 260 may be disposed at the surface of target assembly 105 that is opposite to weapon 150 during an operation of system 100, similar to conductivity layer 210. For example, conductivity layer 210 may be disposed at the backside of target assembly 105 relative to user 145 so that projectiles fired from weapon 150 do not strike conductivity layer 210. For example as illustrated in FIG. 7, sensor 260 may be disposed between the edge of target assembly 105 and the edge of conductivity layer 210 (e.g., in the area of distance "D" depicted in FIG. 7). Sensor 260 may be attached to target assembly 105 via adhesive, a magnet, a mechanical fastener (e.g., a clip), tape or similar adhesive layer, and/or any other suitable attachment technique.

Sensor 260 may be a thermal sensor. Sensor 260 may be a probe sensor. Sensor 260 may be any suitable sensor for sensing a temperature of target assembly 105. Sensor 260 may be a thermocouple sensor, a resistance-temperature detector, a negative temperature coefficient thermistor, an infrared sensor, a semiconductor sensor, a silicon diode sensor, and/or any other suitable thermal sensor. Sensor 260 may transfer signals and/or data indicative of a temperature of target assembly 105 to controller 230 via electrical connector 265 and/or any other suitable communication technique for example as described herein.

Figure 6:
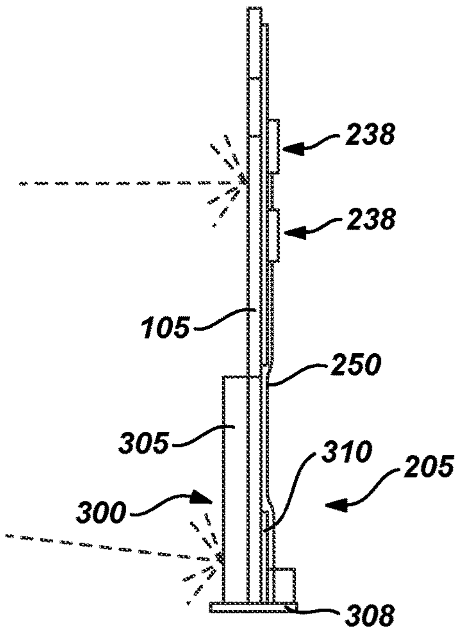
FIG. 6 is a side view of an exemplary embodiment of the present invention.
Figure 8:
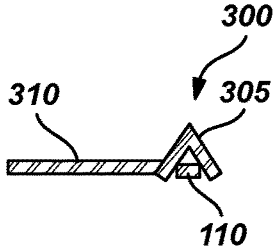
FIG. 8 is a sectional view of the exemplary embodiment of the present invention illustrated in FIG. 7.

Shield assembly 300 may be any suitable assembly for shielding the exemplary disclosed components of thermal assembly 205. For example as illustrated in FIGS. 6-8, shield assembly 300 may include a post member 305 and an assembly member 310. Post member 305 and assembly member 310 may be structural members that may be formed from any suitable shielding material for example similar to the exemplary disclosed materials described above regarding target assembly 105. For example, post member 305 and assembly member 310 may be formed from structural steel (e.g., AR500 steel or similar material). Post member 305 and assembly member 310 may have thicknesses similar to the exemplary disclosed thicknesses described above regarding target assembly 105. Post member 305 and assembly member 310 may be structural angles, structural channels, structural plates, and/or any other suitable shapes. In at least some exemplary embodiments, post member 305 may be a structural angle and assembly member 310 may be a structural plate. Post member 305 may be attached to (e.g., via welding, mechanical fasteners such as screws, and/or any other suitable attachment technique) or integrally include a support member 308 (e.g., a plate) that may be formed from similar material as post member 305. Assembly member 310 may include or be attached to a similar support member and/or be attached to post member 305 (e.g., via welding, mechanical fasteners such as screws, and/or any other suitable attachment technique).

Shield assembly 300 may shield thermal assembly 205. For example, post member 305 may shield the exemplary disclosed electrical connectors running between heaters 215 (e.g., and/or coolers 215), controller 230, and/or power storage 225. Post member 305 may also shield a post 110 supporting target assembly 105 (e.g., when post 105, which can be formed from any of the exemplary disclosed exemplary structural materials, may be damaged by projectiles fired from weapon 150). Assembly member 310 may shield power storage 225, controller 230, charging device 228, and/or the exemplary disclosed electrical connectors. For example, based on being shielded by shield assembly 300, power storage 225, controller 230, and/or charging device 228 may be disposed away from (e.g., remotely from) target assembly 105 during an operation of system 100 (e.g., not attached to target assembly 105). The exemplary disclosed electrical connectors may be attached to post member 305 via adhesive, mechanical fasteners such as clips, magnets, hook and loop fasteners, tape (e.g., similar to as described herein), and/or any other suitable attachment technique.

For example as illustrated in FIGS. 1 and 6-8, shield assembly 300 and target assembly 105 may together shield thermal assembly 205 that may be disposed behind shield assembly 300 and/or disposed behind and/or attached to a rear surface of target assembly 105. Bulletproof surface portions of shield assembly 300 and target assembly 105 may thereby face weapon 150 and be disposed between weapon 150 and thermal assembly 205.

Figure 11:
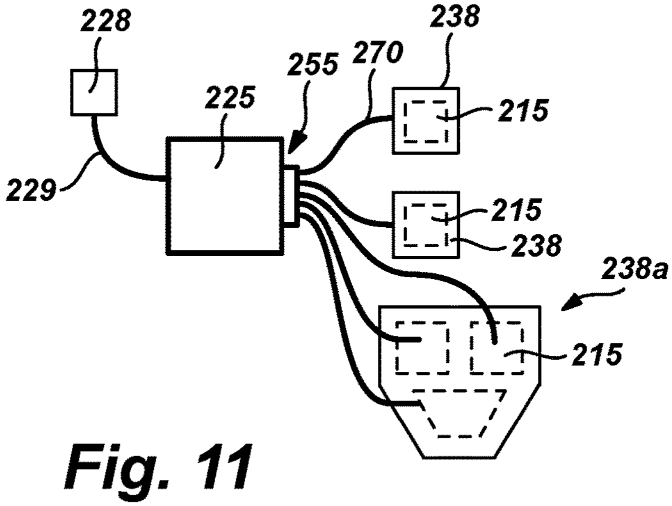
FIG. 11 is a schematic view of an exemplary embodiment of the present invention.

In at least some exemplary embodiments and as illustrated in FIG. 11, power storage 225 may be directly connected to one or more heaters 215 (e.g., and/or coolers 215), e.g., without controller 230, via electrical connectors 270. Power storage 225 may thereby directly power heaters 215 (e.g., and/or coolers 215). Electrical connector 270 may be similar to electrical connectors 229, 245, 250, 255, and 265.

In at least some exemplary embodiments and as illustrated in FIG. 11, any desired number of heaters 215 (e.g., and/or coolers 215) having any desired shape or configuration may be included in a single thermal device (e.g., thermal device **238*a* that may include a housing similar to housing 235). Thermal device 238*a* may be connected to controller 230 or directly to power storage 225**.

Figure 12:
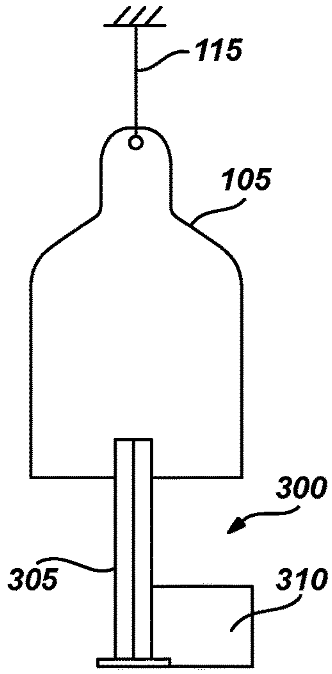
FIG. 12 is a front view of an exemplary embodiment of the present invention.

In at least some exemplary embodiments and as illustrated in FIG. 12, target assembly 105 may be supported by a tension member 115 (e.g., a cable, wire, chain, and/or cord that may be attached to target assembly 105) instead of post 110. Post member 305 and assembly member 310 of shield assembly 300 may be provided to shield components of thermal assembly 205 for example as described above.

Figure 13:
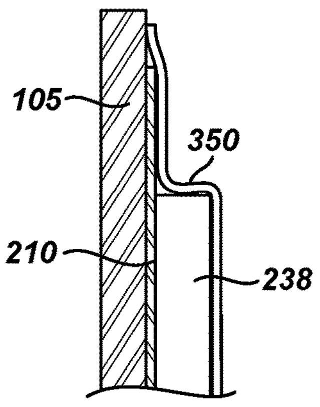
FIG. 13 is a sectional view of an exemplary embodiment of the present invention.

In at least some exemplary embodiments and as illustrated in FIG. 13, thermal device 238 may be attached to conductivity layer 210 via an adhesive layer 350. Adhesive layer 350 may be a single or double-sided tape such as, for example, an acrylic adhesive tape, an epoxy resin tape, a rubber-based tape adhesive, and/or any other suitable type of tape. Adhesive layer 350 may include an adhesive coated onto any suitable tape material such as polypropylene or plastic material. Adhesive layer 350 may be applied over a surface of thermal device 238 and conductivity layer 210 (e.g., and a rear surface of target assembly 105) to adhere thermal device 238 to conductivity layer 210 (e.g., and a rear surface of target assembly 105). Adhesive layer 350 may also be used to attach conductivity layer 210 to target assembly 105 (e.g., in addition to or alternatively to applying adhesive to a surface of conductivity layer 210 and directly adhering it to target assembly 105). Hook and loop fasteners may be used similarly to adhesive layer 350 or as a direct adhesive layer to attach components of thermal assembly 205 to target assembly 105.

Figure 14:
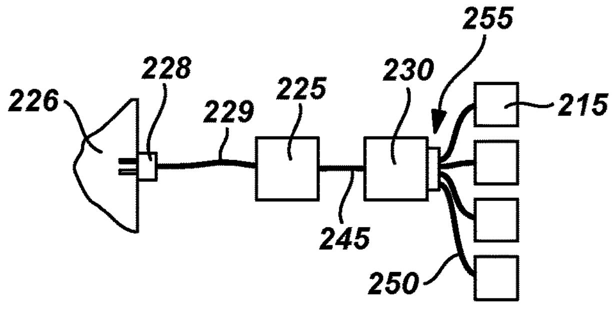
FIG. 14 is a schematic view of an exemplary embodiment of the present invention.
Figure 15:
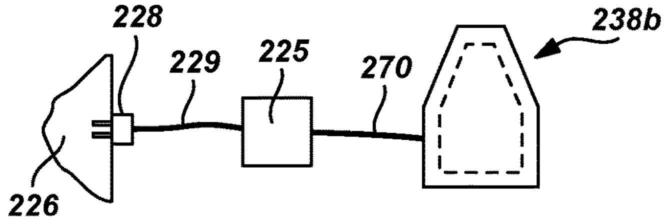
FIG. 15 is a schematic view of an exemplary embodiment of the present invention.

In at least some exemplary embodiments, power storage 225 may be charged via charging device 228 before and/or after an operation of system 100. Charging device 228 may then be removed during an operation of system 100 for example as illustrated in FIG. 7 (e.g., power storage 225 may provide DC power to thermal assembly 205). Alternatively, and for example as illustrated in FIGS. 14 and 15, thermal assembly 205 may be powered via power storage 225 while charging device 228 is electrically connected to a power source (e.g., a power source 226 including for example a wall outlet, via an extension cord if applicable, a generator, a renewable energy device such as a solar device, and/or any other suitable power source). In the exemplary embodiments of FIGS. 14 and 15, AC power may be directly transferred from the power source (e.g., power source 226 for example including a wall outlet) to thermal assembly 205 via power storage 225. Such AC power may be provided both with controller 230 (e.g., FIG. 14) or without controller 230 (e.g., FIG. 15). FIG. 15 illustrates an exemplary embodiment in which a single thermal device **238*b* that includes a polygonal-shaped heater is powered (e.g., thermal device 238*b* may be similar to thermal device 238, 238*a***, and/or any other exemplary disclosed configuration).

Figure 16:
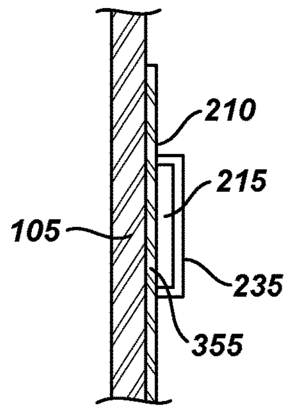
FIG. 16 is a sectional view of an exemplary embodiment of the present invention.

In at least some exemplary embodiments and as illustrated in FIG. 16, the exemplary disclosed heating and/or cooling device may be directly adhered to conductivity layer 210 via a direct adhesive layer 355 that may be similar to the exemplary disclosed adhesive described herein, adhesive layer 350, and/or a mechanical fastener (e.g., a clip). Also for example, conductivity layer 210 may be integrated into thermal device 238 (e.g., may be an integral portion of thermal device 238). For example, conductivity layer 210 may be integrated into thermal device 238 and may form a surface portion of conductivity layer 210 that abuts against a rear surface of target assembly 105.

Figure 17:
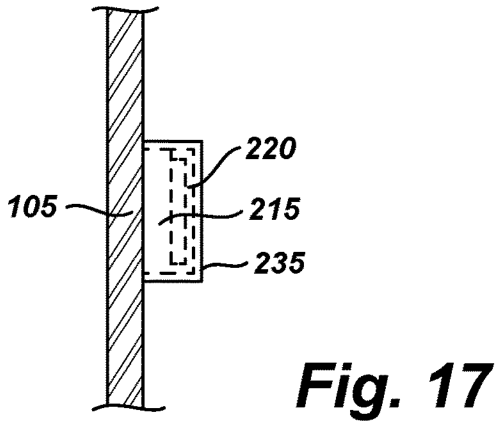
FIG. 17 is a sectional view of an exemplary embodiment of the present invention.

In at least some exemplary embodiments and as illustrated in FIG. 17, the exemplary disclosed heating and/or cooling device may be attached directly to target assembly 105 via attachment device 220 that may be a magnet.

Any suitable features described above (e.g., regarding FIGS. 1-17) may be combined with any of the other exemplary disclosed features. In at least some exemplary embodiments, thermal assembly 205 may be disposed at and/or attached to a previously provided target assembly 105 (e.g., a target assembly 105 already existing at a location such as a shooting range).

In at least some other exemplary embodiments, thermal assembly 205 may be provided with and/or integrated with a new target assembly so that an entire target assembly and thermal assembly can be provided at a given location (e.g., at a location that does not include a previously provided target). For example, shield assembly 300 may be fixedly attached to target assembly 105 and may serve as a support or stand for target assembly 105. Also for example, the exemplary disclosed heating devices and/or sensor 260 may be attached to target assembly 105, and/or power storage 225 and/or controller 230 may be attached to shield assembly 300.

The exemplary disclosed system, apparatus, and method may be used in any suitable application involving thermal imaging devices. The exemplary disclosed system, apparatus, and method may be used in any suitable application for using weapons with thermal imaging devices. The exemplary disclosed system, apparatus, and method may be used in any suitable application for target practice using firearms with thermal imaging devices. For example, the exemplary disclosed system, apparatus, and method may be used in night target practice for firearms using thermal imaging devices.

Figure 18:
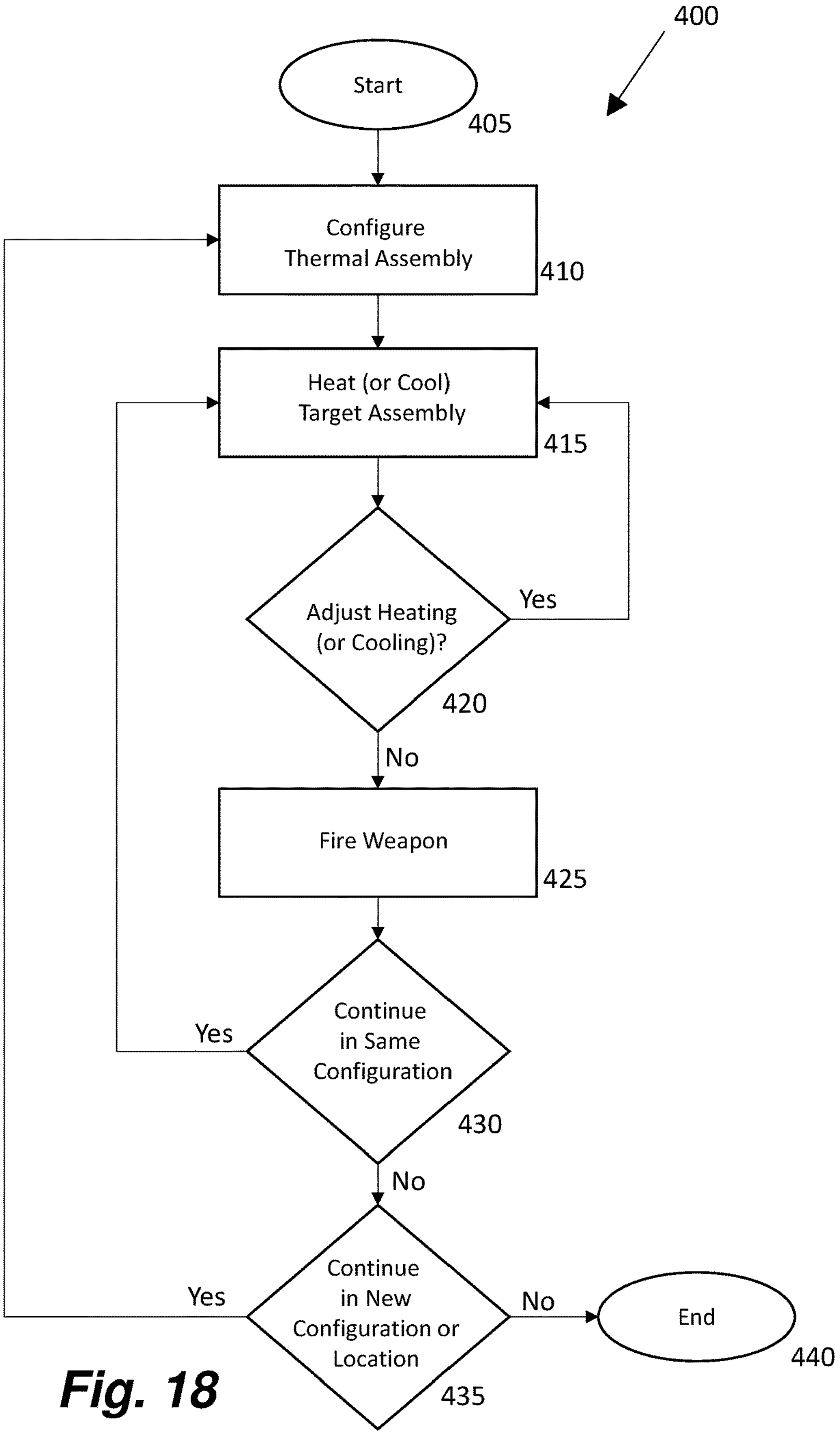
FIG. 18 illustrates an exemplary process of using at least some exemplary embodiments of the present disclosure.

FIG. 18 illustrates an exemplary process of using the exemplary disclosed system and apparatus. Process 400 begins at step 405. At step 410, thermal assembly 205 may be configured. In at least some exemplary embodiments, thermal assembly 205 may be configured at a previously installed or positioned target assembly 105. For example, thermal assembly 205 may be configured at an existing target of a shooting range or similar location. For example, thermal assembly 205 may be configured as illustrated in FIG. 7 (e.g., and/or other exemplary disclosed configurations described above). Conductivity layer 210 may be attached to a rear surface of target assembly 105 using adhesive, adhesive layer 350, direct adhesive layer 355, and/or any other suitable attachment technique for example as described above. Thermal devices 238 may be attached to conductivity layer 210 using any exemplary disclosed attachment techniques. In at least some exemplary embodiments, thermal devices 238 including one or more attachment devices 220 such as magnets may be attached to thermal conductivity layer 210. For example, magnetic force of one or more attachment devices 220 disposed in housing 235 may magnetically attach thermal devices 238 to conductivity layer 210. In at least some exemplary embodiments, conductivity layer 210 may also be attached to target assembly 105 based on magnetic force of one or more attachment devices 220 disposed in housing 235 (e.g., without further attachment devices such as adhesive). In at least some exemplary embodiments, thermal devices 238 may be attached directly to target assembly 105. Sensor 260 may be attached between the edge of target assembly 105 and the edge of conductivity layer 210 for example as described above. The exemplary disclosed electrical connectors (e.g., electrical connectors 229, 245, 250, 265, and/or 270) may be connected between one or more thermal devices 238, controller 230, sensor 260, power storage 225, and/or charging device 228 for example in the exemplary disclosed configurations described above.

Shield assembly 300 may be disposed adjacent to target assembly 105 for example as illustrated in FIG. 7. Assembly member 310 may shield power storage 225, controller 230, charging device 228, and/or the exemplary disclosed electrical connectors. Post member 305 may shield the exemplary disclosed electrical connectors running between thermal devices 238 and controller 230 and/or power storage 225. Target assembly 105 may shield thermal devices 238. Thermal assembly 205 may thereby provide a modular and detachable (e.g., portable and/or temporary) assembly that may be quickly and easily attached to a previously provided target.

In at least some exemplary embodiments, thermal assembly 205, target assembly 105, and/or shield assembly 300 may be provided at a location having no previously provided target. In such a case, system 100 may be provided with a partially and/or entirely integrated apparatus 200 and target assembly 105 (e.g., or provided as a modular system that may be configured at the operation location). Any of the exemplary disclosed configurations of system 100 described above may be provided. After system 100 is configured, process 400 may proceed to step 415.

At step 415, system 100 may operate to change a temperature of target assembly 105. In at least some exemplary embodiments, controller 230 may control power storage 225 to provide electrical energy to thermal devices 238. Controller 230 may be controlled by a user (e.g., user 145 or other user) via the exemplary disclosed user interface of controller 230, the exemplary disclosed user device (e.g., user device 170), automatic control (e.g., a predetermined algorithm and/or time sequence), and/or any other suitable technique. Controller 230 may control power storage 225 to provide a desired amount of electrical energy to thermal devices 238. Thermal devices 238 may thereby provide heating or cooling to target assembly 105 based on (e.g., proportional to) the amount of electrical energy that controller 230 controls power storage 225 to provide to thermal devices 238. Controller 230 may control power storage 225 to provide electrical energy at a constant and/or changing rate over a predetermined time period and/or based on data and/or signals received from sensor 260 as described herein. DC power (e.g., as illustrated in FIG. 7) or AC power (e.g., as illustrated in FIGS. 14 and 15) may be provided to thermal devices 238.

As electrical energy is provided to one or more thermal devices 238, thermal devices 238 may heat (e.g., and/or cool) conductivity layer 210. For example, thermal device 238 may heat conductivity layer 210 when thermal device 238 includes heater 215, and thermal device 238 may cool conductivity layer 210 when thermal device 238 includes cooler 215. Because conductivity layer 210 may be a good conductor and spreader of heat or cold (e.g., have a relatively high thermal conductivity as described above), heat (e.g., or cold) provided by one or more thermal devices 238 may be spread (e.g., relatively evenly spread) across conductivity layer 210. As the heat (e.g., or cold) spreads relatively evenly across conductivity layer 210, the heat (e.g., or cold) transfers from conductivity layer 210 to target assembly 105. Target assembly 105 begins to increase (e.g., or decrease) in temperature. As electrical energy continues to be transferred from power storage 225 to one or more thermal devices 238, and the one or more thermal devices 238 continue to heat (e.g., and/or cool) conductivity layer 210, target assembly 105 increases (e.g., or decreases) in temperature.

Controller 230 may control an operation of power storage 225 based on input or control commands received at steps 415 and 420. For example, input or control commands received at steps 415 and 420 may cause controller 230 to heat (e.g., and/or cool) target assembly 105 to a desired temperature. For example, the desired temperature provided to controller 230 may be a temperature that is at a desired temperature differential from an ambient temperature (e.g., an ambient temperature of objects surrounding target assembly 105). For example, the desired temperature differential may be between about 8° F. and about 12° F. (e.g., about 10° F.) or any other desired amount. For example when an ambient temperature of objects (e.g., object 148) surrounding target assembly 105 is about 70° F., controller 230 may control power storage 225 and one or more thermal devices 238 to heat target assembly 105 to a target temperature of about 80° F. (e.g., or cool target assembly 105 to about 60° F.) or any other suitable temperature (e.g., and temperature differential).

At step 420, heating (e.g., or cooling) may be adjusted. As controller 230 is controlling power storage 225 and one or more thermal devices 238 to heat (e.g., or cool) target assembly 105, sensor 260 may sense an actual temperature of target assembly 105 and transfer signals and/or data of that actual temperature of target assembly 105 to controller 230. If the actual temperature is different from the target temperature for which controller 230 has received input or commands to attain, process 400 returns to step 415. Controller 230 may control power storage 225 and one or more thermal devices 238 to continue to heat (e.g., or cool) target assembly 105 to reach the target temperature. Controller 230 may control an increased amount of electrical energy to be transferred from power storage 225 to thermal devices 238 if the target temperature is to be attained relatively quickly (e.g., in a given time period provided by input). Steps 415 and 420 may be iteratively repeated until the actual temperature is substantially equal to the target temperature. When signals or data from sensor 260 indicate that the actual temperature of target assembly 105 sensed by sensor 260 is substantially equal to the target temperature (e.g., and the desired temperature differential has been reached), the controller 230 may control power storage 225 to either stop transfer of electrical energy to thermal devices 238 or to reduce transfer of electrical energy to thermal devices 238 to an amount to maintain the actual temperature of target assembly 105 at the target temperature (e.g., a reduced amount that substantially prevents the actual temperature of target assembly 105 from gradually returning to an ambient temperature).

When the actual temperature of target assembly 105 is at about the target temperature, a desired temperature differential may exist between the target assembly 105 and surrounding objects. For example as illustrated in FIG. 2, the relatively warmer (e.g., or cooler) target assembly 105 may appear differently (e.g., darker, brighter, lighter, and/or any other desired color or brightness indication) relative to objects surrounding target assembly 105 (e.g., when viewed through thermal imaging device 160). For example at an ambient temperature of 70° F., system 100 may operate to provide a temperature differential of about 10° F. (e.g., by heating target assembly 105 to 80° F. or cooling target assembly 105 to 60° F.) or any other suitable temperature differential. This temperature differential of target assembly 105 from surrounding objects when viewed through thermal imaging device 160 may allow for user 145 to identify and fire at target assembly 105 using weapon 150 and thermal imaging device 160 (e.g., to simulate identifying and firing at a real target for training or target practice). Adjustments in control may also be made via controller 230 (e.g., based on user input or instructions provided to the exemplary disclosed user interface of controller 230 and/or the exemplary disclosed user device) based on the output of thermal imaging device 160 (for example, if a greater temperature differential is desired based on viewing target assembly 105 through thermal imaging device 160, adjustments may be made).

System 100 may also operate to create a temperature differential of target assembly 105 without using controller 230 (e.g., using the configuration illustrated in FIG. 11 or 15). For example at step 415, a user may activate power storage 225 to provide electrical energy to one or more thermal devices 238 that were configured in step 410. For example, user 145 may turn on power storage 225 via a user interface of power storage 225 such as a button or other exemplary disclosed user interface feature described herein, and/or via data or input provided by the exemplary disclosed user device (e.g., user device 170). Power storage 225 may transfer a constant or predetermined amount of electrical energy to one or more thermal devices 238 for example based on a setting or other input provided by user 145 to power storage 225 via the exemplary disclosed user interface and/or user device. Power storage 225 may deliver a constant or predetermined amount of electrical energy over time and/or the delivered electrical energy may be varied via the exemplary disclosed user device (e.g., user device 170) communicating with power storage 225. Adjustments in operation of power storage 225 may be made based on the output of thermal imaging device 160 (for example, if a greater temperature differential is desired based on viewing target assembly 105 through thermal imaging device 160).

After a desired temperature differential is attained by system 100, process 400 may proceed to step 425. At step 425, weapon 150 may be fired by user 145 at heated (e.g., or cooled) target assembly 105 (e.g., along with using thermal imaging device 160). For example, user 145 may participate in training such as target practice or a live fire exercise (e.g., or any other desired training or activity) using system 100.

At step 430 it may be determined whether use of system 100 is to be continued in the same configuration. If use is to be continued in the same configuration (e.g., same placement of thermal devices 238), process 400 returns to step 415. As many iterations as desired of steps 415 through 430 may be performed. If use is not to be continued in the same configuration, process 400 proceeds to step 435.

At step 435 it may be determined whether use of system 100 is to be continued in a new configuration or location. If use is to be continued in a new configuration or location, process 400 returns to step 410. System 100 may be moved to a new location and configured or may be reconfigured at the same location. As many iterations as desired of steps 410 through 435 may be performed. If use is not to be continued in a new configuration or location, process 400 ends at step 440.

In at least some exemplary embodiments, the exemplary disclosed apparatus is an apparatus for a target for a weapon, the apparatus including a conductivity layer configured to be removably attached to the target, at least one thermal device configured to be removably attached to the conductivity layer, and a power storage electrically connected to the at least one thermal device. In at least some exemplary embodiments, the at least one thermal device is configured to heat or cool the conductivity layer. In at least some exemplary embodiments, the conductivity layer has a thermal conductivity that is both greater than the target and between 200 W/mK and 400 W/mK. In at least some exemplary embodiments, the apparatus further comprises at least one magnet configured to removably attach the at least one thermal device to the conductivity layer. In at least some exemplary embodiments, the at least one thermal device includes a housing containing the at least one magnet and a heater or a cooler. In at least some exemplary embodiments, the apparatus further comprises a controller and a thermal sensor, the thermal sensor electrically connected to the controller and configured to be removably attached to the target. In at least some exemplary embodiments, the conductivity layer has a thermal conductivity of between about 8 and about 9 times greater than steel. In at least some exemplary embodiments, the conductivity layer is a copper plate or a bladder containing a fluid. In at least some exemplary embodiments, the apparatus further comprises a shield assembly configured to shield the power storage from projectiles fired by the weapon, the shield assembly including at least one of a structural plate or a structural member. In at least some exemplary embodiments, the apparatus further comprises an adhesive layer configured to attach the at least one thermal device to the conductivity layer. In at least some exemplary embodiments, the conductivity layer is configured to be attached to a rear surface of the target facing away from the weapon when the weapon is fired.

In at least some exemplary embodiments, the exemplary disclosed method is a method for a target for a weapon, the method including removably attaching a conductivity layer to the target, removably attaching at least one thermal device to the conductivity layer, electrically connecting a controller to the at least one thermal device, electrically connecting a power storage to the controller, removably attaching a thermal sensor to the target and electrically connecting the thermal sensor to the controller, sensing an actual temperature of the target using the thermal sensor and transferring a signal or a data indicative of the actual temperature to the controller, and heating or cooling the conductivity layer based on the controller controlling the power storage to transfer electricity to the at least one thermal device based on the signal or the data. In at least some exemplary embodiments, the method further comprises heating or cooling the conductivity layer until the actual temperature is equal to a target temperature, the target temperature being different from an ambient temperature by a temperature differential amount. In at least some exemplary embodiments, the temperature differential amount is between 8° F. and 12° F. In at least some exemplary embodiments, the method further comprises using a thermal imaging device of the weapon to view the temperature differential amount between the target and objects surrounding the target. In at least some exemplary embodiments, transferring electricity to the at least one thermal device includes at least one of transferring DC power from the power storage or transferring AC power from the power storage that is connected to a power source.

In at least some exemplary embodiments, the exemplary disclosed apparatus is an apparatus for a target for a weapon, the apparatus including at least one thermal device configured to be removably attached to the target via at least one magnet of the at least one thermal device, a controller electrically connected to the at least one thermal device, a power storage electrically connected to the controller, the controller being electrically disposed between the power storage and the at least one thermal device, and a thermal sensor electrically connected to the controller and configured to be removably attached to the target, the thermal sensor configured to sense an actual temperature of the target and transfer a signal or a data indicative of the actual temperature to the controller, wherein the controller is configured to control an amount of electricity transferred from the power storage to the at least one thermal device to heat the target based on the signal or the data. In at least some exemplary embodiments, the at least one thermal device includes a housing containing the at least one magnet and a heater. In at least some exemplary embodiments, the at least one thermal device is a plurality of thermal devices, each of the plurality of thermal devices including the housing containing the at least one magnet and the heater. In at least some exemplary embodiments, the apparatus further comprises an electrical splitter electrically connected between the controller and the at least one thermal device that is a plurality of thermal devices, the plurality of thermal devices connected in parallel via the electrical splitter. In at least some exemplary embodiments, the apparatus further comprises a conductivity layer disposed between the target and the at least one thermal device, the conductivity layer having a thermal conductivity of between 350 W/mK and 450 W/mK. In at least some exemplary embodiments, the conductivity layer is a copper layer that is heated by the at least one thermal device.

In at least some exemplary embodiments, the exemplary disclosed system, apparatus, and method may provide an efficient and effective system for providing target practice involving identifying temperature differences of targets from surroundings using thermal imaging devices. For example, the exemplary disclosed system, apparatus, and method may provide a quick and efficient technique for providing a new target or modifying an existing target to provide temperature differences with the target environment. The exemplary disclosed system, apparatus, and method may provide an efficient technique for providing targets for night or day target practice using firearms with thermal imaging devices.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus for a target for a weapon, comprising:
- a conductivity layer configured to be removably attached to the target;
- at least one thermal device configured to be removably attached to the conductivity layer; and
- a power storage electrically connected to the at least one thermal device;
- wherein the at least one thermal device is configured to heat or cool the conductivity layer; and
- wherein the conductivity layer has a thermal conductivity that is both greater than the target and between 200 W/mK and 400 W/mK.

2. The apparatus of claim 1, further comprising at least one magnet configured to removably attach the at least one thermal device to the conductivity layer.

3. The apparatus of claim 2, wherein the at least one thermal device includes a housing containing the at least one magnet and a heater or a cooler.

4. The apparatus of claim 1, further comprising a controller and a thermal sensor, the thermal sensor electrically connected to the controller and configured to be removably attached to the target.

5. The apparatus of claim 1, wherein the conductivity layer has a thermal conductivity of between about 8 and about 9 times greater than steel.

6. The apparatus of claim 1, wherein the conductivity layer is a copper plate or a bladder containing a fluid.

7. The apparatus of claim 1, further comprising a shield assembly configured to shield the power storage from projectiles fired by the weapon, the shield assembly including at least one of a structural plate or a structural member.

8. The apparatus of claim 1, further comprising an adhesive layer configured to attach the at least one thermal device to the conductivity layer.

9. The apparatus of claim 1, wherein the conductivity layer is configured to be attached to a rear surface of the target facing away from the weapon when the weapon is fired.

10. A method for a target for a weapon, comprising:
removably attaching a conductivity layer to the target;
removably attaching at least one thermal device to the conductivity layer;
electrically connecting a controller to the at least one thermal device;
electrically connecting a power storage to the controller;
removably attaching a thermal sensor to the target and electrically connecting the thermal sensor to the controller;
sensing an actual temperature of the target using the thermal sensor and transferring a signal or a data indicative of the actual temperature to the controller; and
heating or cooling the conductivity layer based on the controller controlling the power storage to transfer electricity to the at least one thermal device based on the signal or the data.

11. The method of claim 10, further comprising heating or cooling the conductivity layer until the actual temperature is equal to a target temperature, the target temperature being different from an ambient temperature by a temperature differential amount.

12. The method of claim 11, wherein the temperature differential amount is between 8° F. and 12° F.

13. The method of claim 10, further comprising using a thermal imaging device of the weapon to view the temperature differential amount between the target and objects surrounding the target.

14. The method of claim 10, wherein transferring electricity to the at least one thermal device includes at least one of transferring DC power from the power storage or transferring AC power from the power storage that is connected to a power source.

15. An apparatus for a target for a weapon, comprising:
at least one thermal device configured to be removably attached to the target via at least one magnet of the at least one thermal device;
a controller electrically connected to the at least one thermal device;
a power storage electrically connected to the controller, the controller being electrically disposed between the power storage and the at least one thermal device; and
a thermal sensor electrically connected to the controller and configured to be removably attached to the target, the thermal sensor configured to sense an actual temperature of the target and transfer a signal or a data indicative of the actual temperature to the controller;
wherein the controller is configured to control an amount of electricity transferred from the power storage to the at least one thermal device to heat the target based on the signal or the data.

16. The apparatus of claim 15, wherein the at least one thermal device includes a housing containing the at least one magnet and a heater.

17. The apparatus of claim 16, wherein the at least one thermal device is a plurality of thermal devices, each of the plurality of thermal devices including the housing containing the at least one magnet and the heater.

18. The apparatus of claim 15, further comprising an electrical splitter electrically connected between the controller and the at least one thermal device that is a plurality of thermal devices, the plurality of thermal devices connected in parallel via the electrical splitter.

19. The apparatus of claim 15, further comprising a conductivity layer disposed between the target and the at least one thermal device, the conductivity layer having a thermal conductivity of between 350 W/mK and 450 W/mK.

20. The apparatus of claim 19, wherein the conductivity layer is a copper layer that is heated by the at least one thermal device.

* * * * *